United States Patent

Howell et al.

[15] 3,689,176
[45] Sept. 5, 1972

[54] TURBOMACHINERY ROTOR CONSTURCTION

[72] Inventors: Thomas G. Howell, West Chester; Bernard L. Koff, Cincinnati, both of Ohio

[73] Assignee: General Electric Company,

[22] Filed: April 2, 1971

[21] Appl. No.: 130,680

[52] U.S. Cl. .................... 416/96, 416/97, 416/219
[51] Int. Cl. ............................................ F01d 5/18
[58] Field of Search ...... 416/221, 230, 219, 214, 220, 416/500, 90, 92, 95, 97

[56] References Cited

UNITED STATES PATENTS

| | | | |
|---|---|---|---|
| 2,807,434 | 9/1957 | Zimmerman | 416/95 X |
| 2,858,103 | 10/1958 | Waugh | 416/97 |
| 2,873,947 | 2/1959 | Perry | 416/220 |
| 3,164,367 | 1/1965 | Lynch | 416/96 |
| 3,266,770 | 8/1966 | Harlow | 416/190 X |
| 3,490,852 | 1/1970 | Carlstrom et al. | 416/95 |

*Primary Examiner*—Everette A. Powell, Jr.
*Attorney*—Derek P. Lawrence, Erwin F. Berrier, Jr., Lee H. Sachs, Frank L. Neuhauser, Oscar B. Waddell and Joseph B. Forman

[57] ABSTRACT

A turbomachinery rotor construction includes a disk having alternately offset fluid passage slots radially inwardly of each blade locking slot and fastener apertures disposed between the slots for use in connecting the disk to an annular rotor portion. The innermost portion of each aperture is located on a radius not less than that described by the innermost portion of the fluid passage slots so as to enhance the low cycle fatigue characteristics of the disk while reducing the disk rim dead load.

6 Claims, 4 Drawing Figures

PATENTED SEP 5 1972 3,689,176
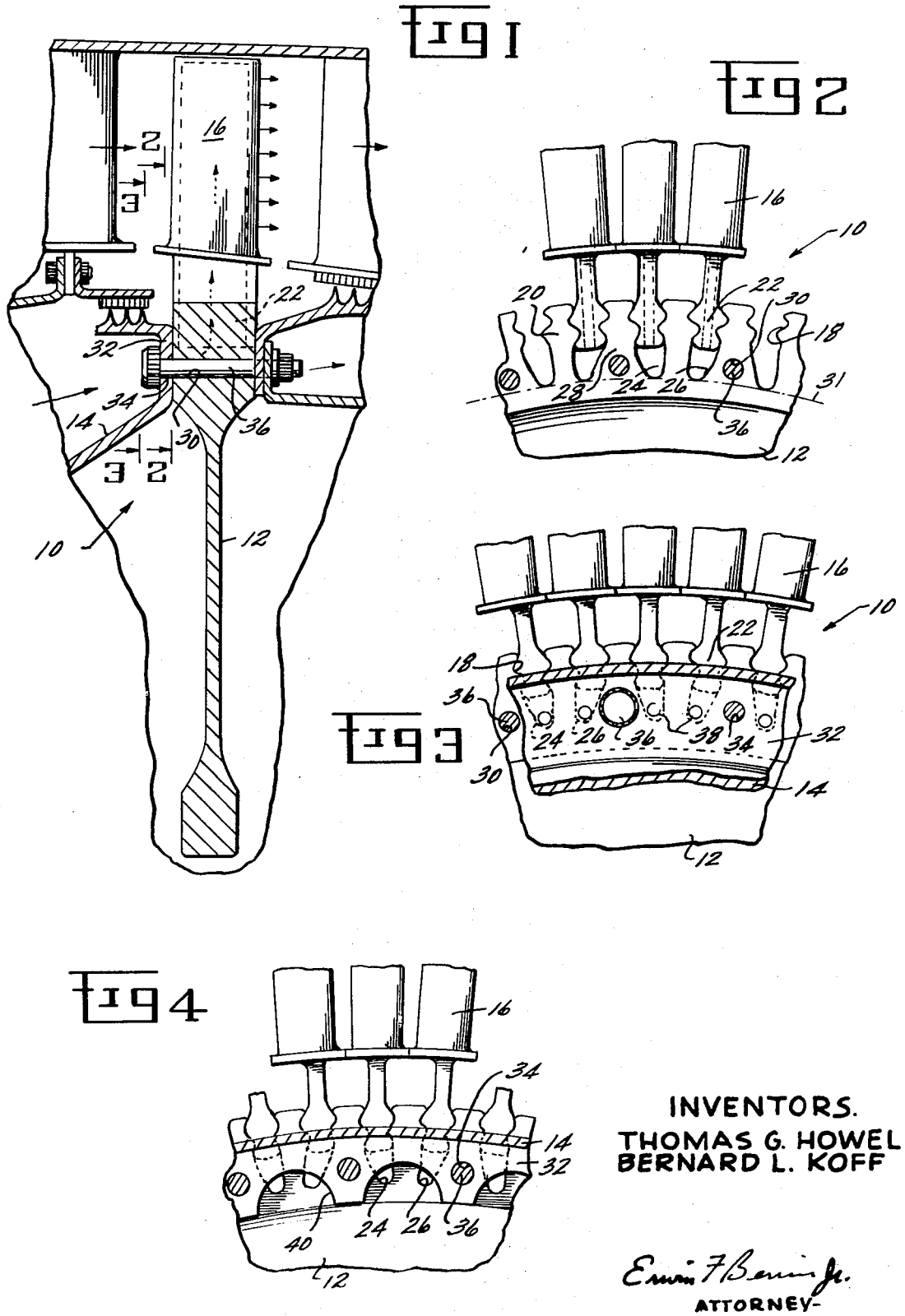
INVENTORS.
THOMAS G. HOWELL
BERNARD L. KOFF
Erwin F Bening Jr.
ATTORNEY

TURBOMACHINERY ROTOR CONSTURCTION

This invention relates to gas turbine engines and, more particularly, to turbomachinery rotors therefor.

In advanced aircraft gas turbine engines it is often necessary or desirable to supply a coolant or compressor bleed flow to the radial inner end of turbomachinery disk blade retaining slots for use in cooling turbine blades, for use in cooling the turbine rotor disk rim and/or for interstage seal pressurization or blockage.

Where the foregoing requirement is coupled with a requirement to secure a turbine rotor shaft or spacer flange to the disk rim, whether for structural, coolant logistics or other reasons, it is desirable to keep the flange attachment or bolt holes in the disk above the circumferentially continuous portion of the disk which operates to carry the hoop stress so as to both enhance the low cycle fatigue characteristics of the disk and minimize the radial depth of the rim and, hence, the rim dead load (the non-circumferentially continuous portion of the disk). This, in turn, results in a reduction in the disk weight.

A primary object of this invention, therefore, is to provide a turbomachinery disk rim configuration which facilitates the supply of fluid to the radial inner end of each blade locking slot, enhances the low cycle fatigue characteristics of the disk, and minimizes the rim dead load.

Briefly, the above and other objects and advantages, which will become apparent upon reading hereinafter, are achieved by providing a fluid passage slot which is formed as a radially inward continuation of each blade locking slot. The fluid passage slots are alternately offset to the left and right of the radial axis of their respective blade locking slots so as to permit a bolt hole to be formed between each spaced pair of fluid passage slots.

It is believed that the present invention will be better understood upon reading the following description of the preferred embodiment in connection with the drawings, wherein:

FIG. 1 is an axial half cross-sectional view showing a turbomachinery rotor disk and a portion of a connecting shaft or spacer;

FIG. 2 is a fragmentary sectional view taken along lines 2—2 of FIG. 1;

FIG. 3 is a fragmentary sectional view taken along lines 3—3 of FIG. 1; and

FIG. 4 is a view like FIG. 3, showing an alternate construction.

Like reference numerals will be used in referring to like parts throughout the following description of the invention.

With reference now to FIG. 1, a portion of a turbomachinery rotor for a compressor, fan or turbine, has been shown in axial half cross section at 10 as comprising a disk 12, a shaft segment or spacer 14 and a plurality of radially extending blades 16.

The disk 12 is formed at its periphery or rim 20 with a plurality of circumferentially spaced, axially extending blade retaining slots 18, as best shown in FIG. 2. As will be understood, each blade retaining slot 18 is formed to receive a root portion 22 of a blade 16 to lock the blade to the disk 12.

As previously discussed, it is often necessary or desirable to direct a pressurized fluid from one side of the disk 12 to the other for use as seal pressurization or blockage, or to direct a fluid internally of the blade 16 for cooling purposes. To this end, a fluid passage slot, as at 24 or 26, is formed radially inwardly of an as a continuation of each blade retaining slot 18.

As best shown in FIG. 2, alternate ones of the fluid passage slots 24, 26 are offset to the left and right of the radial axis of their respective blade retaining slots 18. For example, as viewed in FIG. 2, each slot 24 is offset to the right of its respective blade locking slot 18, while each alternate slot 26 is offset to the left of its respective blade locking slot 18. In this manner, an enlarged base area portion 28 is formed at the disk rim 20 between each pair of peripherally adjacent fluid passage slots 24, 26 in which a suitable aperture or hole 30 may be formed axially through the disk rim for receipt of a fastener 36. By using discrete bolt holes or apertures 30, the disk 12 and rotor portion 14 may be maintained in close concentric alignment during operation so as to minimize possible imbalance.

The disk apertures 30 are preferably sized and located so that they are radially beyond or tangent, at their innermost extent, to a circular line, as at 31 in FIG. 2, which defines the innermost extent of each fluid passage slot 24, 26.

By providing the enlarged base area portion 28, adequate strength is provided in the dovetail portion 28 of the disk rim while permitting the use of large area, low pressure drop cooling air passages 24, 26.

The rotor shaft or spacer 14 is formed with a flange 32, which may extend radially outwardly, as shown in FIGS. 1 and 3, or radially inwardly as shown in FIG. 4. The flange 32 is formed with an aperture 34 corresponding to each disk aperture 30 for receipt of and to facilitate attachment of the flange 32 to the disk using suitable fasteners, as at 36 in FIG. 1.

By offsetting the fluid passage slots 24, 26 to form the enlarged base area portions 28 in the disk rim 20, and by locating the disk apertures 30 in such enlarged base area portions 28, all as described, the circumferentially continuous portion of the disk which will carry the hoop stresses (portion of disk radially inward of line 31) is maintained imperforate, thereby enhancing the disk low cycle fatigue characteristics. At the same time, it will be recognized that the disk rim configuration of the present invention also operates to substantially reduce the rim dead load or the non-circumferentially continuous portion of the disk radially outwardly of circumferential line 31. This in turn, results in a reduction of disk weight.

The flange 32 is formed with passage means, such as apertures 38 in FIG. 3, through which the coolant or pressurized fluid is delivered to the slots 24, 26.

An alternate construction is shown in FIG. 4 wherein the flange 32 extends radially inwardly and the flange passage means takes the form of scallops 40 formed in the inner circumferential edge of the flange 32.

From the foregoing, it will be appreciated that the present invention provides a turbomachinery disk rim configuration which facilitates the supply of fluid to the radial inner end of each blade locking slot, enhances the low cycle fatigue characteristics of the disk, and minimizes the rim dead load.

While a preferred embodiment of the present invention has been depicted and described, it will be appreciated that such is exemplary only and not definitive and that many additions, modifications and changes may be made thereto without departing from the fundamental theme of the invention.

What is claimed is:

1. In a turbomachinery rotor of the type having a disk formed with a plurality of generally axially extending blade locking slots at its periphery, an annular rotor portion, and fastening means connecting said disk and said rotor portion adjacent the periphery of said disk, the improvement comprising:

a fluid passage slot for each said blade locking slot, each said fluid passage slot formed as a continuation of and being offset from the radial axis of its respective blade locking slot, with peripheral adjacent ones of said fluid passage slots being offset in opposite directions from their respective locking slot radial axes so as to define an enlarged base portion between peripherally adjacent pairs of said fluid passage slots, a generally axially extending aperture formed through each enlarged base portion for receipt of said fastening means, with the radial innermost extent of said apertures being on a radius not less than the radius of the innermost extent of any of said fluid passage slots, and passage means formed in said annular rotor portion to enable passage of fluid into said passage slots.

2. The improvement of claim 1 further characterized in that said fluid passage slots extend transversely of the disk.

3. The improvement of claim 1 further characterized in that said annular rotor portion includes a radial flange, said passage means being formed in said disk and rotor portion being connected through said flange.

4. A turbomachinery rotor comprising a disk formed with a plurality of axially extending blade locking slots at its periphery, a turbomachinery blade extending radially from each said locking slot and having a root portion engaged therewith, a plurality of fluid passage slots for delivery of pressurized fluid to the radial inner end of each said blade, each said fluid passage slot formed as a radially inward extension of its respective blade locking slot and being offset from the radial axis thereof, with peripherally adjacent fluid passage slots being offset in opposite directions so as to define an enlarged base portion between adjacent pairs of said fluid passage slots, an annular rotor portion, an aperture formed through each enlarged base portion and traversing said disk, with the radial innermost extent of said apertures being on a radius not less than the radius of the innermost extent of any of said fluid passage slots, and fastener means extending through said apertures and connecting said disk and said rotor portion.

5. The structure of claim 4 further characterized in that said rotor portion includes and is connected to said disk through a radial flange.

6. The structure of claim 5 further characterized in that said radial flange includes passage means for delivery of fluid to said fluid passage slots.

* * * * *